United States Patent
Pursifull et al.

(10) Patent No.: US 9,175,599 B2
(45) Date of Patent: Nov. 3, 2015

(54) METHOD FOR OPERATING AN INTERNAL COMBUSTION ENGINE WITH GAS AS A FUEL

(75) Inventors: Ross Dykstra Pursifull, Dearborn, MI (US); Ulrich Kramer, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 688 days.

(21) Appl. No.: 13/237,574

(22) Filed: Sep. 20, 2011

(65) Prior Publication Data
US 2012/0041665 A1   Feb. 16, 2012

(51) Int. Cl.
| | |
|---|---|
| F02M 21/02 | (2006.01) |
| F02B 43/10 | (2006.01) |
| F01B 1/02 | (2006.01) |
| F01B 3/02 | (2006.01) |
| F02D 19/06 | (2006.01) |

(Continued)

(52) U.S. Cl.
CPC . *F02B 43/10* (2013.01); *F01B 1/02* (2013.01); *F01B 3/02* (2013.01); *F02D 19/0615* (2013.01); *F02D 19/0647* (2013.01); *F02D 19/0689* (2013.01); *F02D 19/0692* (2013.01); *F02D 19/0694* (2013.01); *F02D 35/027* (2013.01); *F02D 41/3029* (2013.01); *F02D 41/3094* (2013.01); *F02M 21/0287* (2013.01); *F02D 19/081* (2013.01); *F02D 19/084* (2013.01); *F02D 41/0002* (2013.01); *F02D 41/0025* (2013.01); *F02D 2250/21* (2013.01); *Y02T 10/32* (2013.01); *Y02T 10/36* (2013.01)

(58) Field of Classification Search
CPC . F02B 43/10; F02D 19/0694; F02D 41/3029; F02D 35/027; F02D 19/0689; F02D 41/3094; F02D 19/0647; F02D 19/0615; F02D 19/0692; F02D 19/081; F01B 3/02; F01B 1/02; F02M 21/0287; Y02T 10/32
USPC .................. 123/575–578, 525, 299, 305, 304
See application file for complete search history.

(56) References Cited

U.S. PATENT DOCUMENTS

| | | | | |
|---|---|---|---|---|
| 6,659,071 | B2 * | 12/2003 | LaPointe et al. | 123/299 |
| 6,684,849 | B2 * | 2/2004 | zur Loye et al. | 123/295 |

(Continued)

FOREIGN PATENT DOCUMENTS

| | | |
|---|---|---|
| CN | 101025130 A | 8/2007 |
| CN | 101260846 A | 9/2008 |

(Continued)

OTHER PUBLICATIONS

Partial Translation of Office Action of Chinese Application No. 201110227034.0, Issued Oct. 10, 2014, State Intellectual Property Office of PRC, 11 Pages.

*Primary Examiner* — Thomas Moulis
*Assistant Examiner* — Joseph Dallo
(74) *Attorney, Agent, or Firm* — Julie Voutyras; Alleman Hall McCoy Russell & Tuttle LLP

(57) ABSTRACT

A method for operating an internal combustion engine is provided. The method comprises, during low and medium load conditions, introducing fuel from a fuel tank by intake pipe injection into at least one intake air line coupled to at least one cylinder, and during high load conditions, introducing the fuel from the fuel tank by direct injection into the at least one cylinder. In this way, the method of fuel delivery may be optimized based on the load conditions.

17 Claims, 7 Drawing Sheets

(51) Int. Cl.
    F02D 35/02      (2006.01)
    F02D 41/30      (2006.01)
    F02D 41/00          (2006.01)
    F02D 19/08          (2006.01)

(56) References Cited

U.S. PATENT DOCUMENTS

| | | | |
|---|---|---|---|
| 6,978,762 B2 * | 12/2005 | Mori | 123/430 |
| 7,082,928 B2 * | 8/2006 | Fritsch et al. | 123/478 |
| 7,111,452 B2 * | 9/2006 | Miyoshi et al. | 60/285 |
| 7,284,506 B1 * | 10/2007 | Sun et al. | 123/1 A |
| 7,320,297 B2 * | 1/2008 | Kamio et al. | 123/1 A |
| 7,546,834 B1 * | 6/2009 | Ulrey et al. | 123/525 |
| 7,587,998 B2 * | 9/2009 | Hotta et al. | 123/3 |
| 7,621,257 B1 * | 11/2009 | Leone et al. | 123/431 |
| 7,769,527 B2 * | 8/2010 | Noda et al. | 701/104 |
| 7,869,930 B2 * | 1/2011 | Stein et al. | 701/104 |
| 2002/0002967 A1 * | 1/2002 | Paul et al. | 123/525 |
| 2002/0166515 A1 * | 11/2002 | Ancimer et al. | 123/27 R |
| 2005/0172931 A1 * | 8/2005 | Mori | 123/305 |
| 2005/0268889 A1 * | 12/2005 | Kojima et al. | 123/458 |
| 2006/0005812 A1 * | 1/2006 | Mashiki | 123/431 |
| 2006/0011165 A1 * | 1/2006 | Frey et al. | 123/299 |
| 2006/0180121 A1 * | 8/2006 | Wickman et al. | 123/299 |
| 2007/0163537 A1 * | 7/2007 | Kamio et al. | 123/304 |
| 2007/0215098 A1 * | 9/2007 | Hashimoto et al. | 123/304 |
| 2007/0215112 A1 * | 9/2007 | Brehob et al. | 123/431 |
| 2008/0022982 A1 * | 1/2008 | Kamiyama | 123/575 |
| 2008/0029072 A1 * | 2/2008 | Ceratto | 123/527 |
| 2008/0060616 A1 * | 3/2008 | Ito | 123/436 |
| 2008/0127933 A1 * | 6/2008 | Blumberg et al. | 123/304 |
| 2008/0289600 A1 * | 11/2008 | Kurotani et al. | 123/304 |
| 2009/0012698 A1 * | 1/2009 | Shinagawa et al. | 701/103 |
| 2009/0043479 A1 * | 2/2009 | Noda et al. | 701/103 |
| 2009/0229541 A1 * | 9/2009 | Shimasaki et al. | 123/3 |
| 2009/0265078 A1 * | 10/2009 | Mallebrein et al. | 701/103 |
| 2010/0147262 A1 * | 6/2010 | Martin et al. | 123/299 |
| 2010/0250100 A1 * | 9/2010 | Tomiita et al. | 701/104 |
| 2010/0288367 A1 | 11/2010 | Pursifull | |
| 2010/0318277 A1 * | 12/2010 | Pursifull et al. | 701/103 |
| 2010/0318284 A1 * | 12/2010 | Surnilla et al. | 701/113 |
| 2011/0017174 A1 | 1/2011 | Ulrey et al. | |
| 2011/0132290 A1 | 6/2011 | Leone et al. | |
| 2011/0168132 A1 | 7/2011 | Pursifull | |

FOREIGN PATENT DOCUMENTS

| | | | | |
|---|---|---|---|---|
| CN | 101526047 A | | 9/2009 | |
| DE | 102010037003 A1 | | 2/2012 | |
| JP | 63005152 A | * | 1/1988 | F02M 21/02 |
| JP | 03003934 A | * | 1/1991 | F02D 41/02 |

* cited by examiner

METHOD FOR OPERATING AN INTERNAL COMBUSTION ENGINE WITH GAS AS A FUEL

FIELD

The disclosure relates to a method for operating an internal combustion engine having at least one cylinder and at least one intake line for supplying fresh air or fresh mixture to the at least one cylinder, with gas and/or liquid being used as a fuel.

BACKGROUND AND SUMMARY

On account of the limited resources of fossil fuels, in particular on account of the limited availability of mineral oil as a raw material for obtaining fuels for operating internal combustion engines, use is increasingly being made of alternative fuels for operating internal combustion engines.

In the case of Otto-cycle engines, aside from gasoline as the traditional Otto-cycle fuel, alternative fuels are also being used, such as liquefied gas (LPG—Liquefied Petroleum Gas), a propane/butane mixture also referred to as Autogas, natural gas (CNG—Compressed Natural Gas), predominantly methane, hydrogen ($H_2$), ethanol or fuel mixtures composed of gasoline and ethanol. Since different fuels have different physical and chemical properties, the internal combustion engine may be configured for the specific fuel being used.

Here, an adaptation of the operating parameters of the internal combustion engine, for example of the ignition time and of the injection time, is used. The control times, the charge pressure, the cooling water temperature, the injection duration, the charge-air quantity and/or the like, or else design parameters such as the compression ratio, can be and are often configured for operation with a specific fuel.

The fuel-specific configuration, for example, of the compression ratio makes allowance, in the case of Otto-cycle fuels, for the fact that different fuel types have different knocking resistances, specified by the octane numbers RON or MON. That is to say, a specific compression ratio which permits problem-free operation of the internal combustion with one specific fuel may lead to knocking, or to auto-ignition before the actual ignition time, which often results in knocking combustion, if a different fuel is used. Since knocking and auto-ignition should be prevented in order to avoid damage to the internal combustion engine, the fuel used, or the knocking resistance thereof, should be taken into consideration in the configuration of the internal combustion engine.

The fuel used also influences the physical design of the fuel supply system of the internal combustion engine, in particular of the injection system, which, as an auxiliary unit of the internal combustion engine, serves for introducing the fuel. Here, a distinction can basically be made between two concepts for fuel injection, specifically intake pipe injection and direct injection.

In the case of intake pipe injection, the spark-ignition engine operates with a homogeneous fuel-air mixture prepared by external mixture formation by virtue of fuel being introduced into the at least one intake line into the inducted air. The desired power is set by varying the charge quantity of the cylinder, such that the working process of the Otto-cycle engine—in contrast to the diesel engine—is based on quantity regulation.

Load control is generally carried out by means of a throttle flap provided in the intake line. By adjusting the throttle flap, the pressure of the inducted air downstream of the throttle flap can be reduced to a greater or lesser extent. The further the throttle flap is closed, that is to say the more the intake line is blocked, the higher the pressure loss of the inducted air across the throttle flap, and the lower the pressure of the inducted air downstream of the throttle flap and upstream of the inlet into the cylinder. For a constant combustion chamber volume, it is possible in this way for the air mass, that is to say the quantity, to be set by means of the pressure of the inducted air. Said type of load control has proven to be particularly disadvantageous in the part-load range, because low loads may use a large amount of throttling and a large pressure reduction in the inducted air.

To reduce the described throttling losses, that is to say charge exchange losses, different concepts have been developed. One proposed solution for dethrottling the Otto-engine working process is based on the transfer of technical features of the traditional diesel engine process, which is characterized by air compression, an inhomogeneous mixture, auto-ignition and quality regulation, in which the load is controlled by means of the fuel quantity injected directly into the at least one cylinder. Throttling of the inducted air is omitted out of principle.

The injection of fuel directly into the combustion chamber of the cylinder is considered to be a suitable measure for noticeably reducing fuel consumption even in Otto-cycle engines. The improvement in efficiency can, with stratified mixture formation, be attained by dethrottling, such that use is made, to a certain extent, of quality regulation. Furthermore—as a result of the utilization of the evaporation enthalpy of the fuel which evaporates directly in the combustion chamber—a cylinder-internal cooling effect is attained which permits a further increase in efficiency by increasing the compression ratio. Said effect also leads, in the case of a homogeneous direct injection, to a reduction in fuel consumption. Here, the homogeneous direct injection operates, similarly to the intake pipe injection, with a homogeneous fuel/air mixture.

A disadvantage of direct injection is that a comparatively short amount of time is available for the injection of the fuel, the mixture preparation in the combustion chamber, specifically the preparation of the fuel, if appropriate by evaporation, and the thorough mixture of air and fuel, and also the ignition of the prepared mixture.

Direct-injection Otto-cycle processes are therefore significantly more sensitive to changes and deviations in mixture formation, in particular in injection and in ignition, than conventional Otto-cycle processes. Here, the inhomogeneity of the mixture and the cyclical variability thereof oppose a reliable and defined ignition of the fuel/air mixture.

The inventors herein have recognized the above advantages and disadvantages and offer a solution to at least partly address the disadvantages. Thus, a method for operating an internal combustion engine is provided. The method comprises, during low and medium load conditions, introducing gas fuel to at least one cylinder of the engine by intake pipe injection into at least one intake air line coupled to the at least one cylinder, and during high load conditions, introducing gas fuel to the at least one cylinder by direct injection into the at least one cylinder.

The method according to the disclosure makes use of both injection methods, that is to say both intake pipe injection and also direct injection, and thereby makes it possible at any operating point to use the injection method suitable for that operating point, or to select and apply the injection method which is more advantageous with regard to a present objective.

The gas which serves as a fuel may for example be introduced into the intake line by intake pipe injection in order to attain expedient fuel consumption values in part-load operation. With regard to a good thorough mixture, that is to say homogenization, of the fuel/air mixture, intake pipe injection offers advantages over direct injection when small fuel quantities, that is to say gas quantities, are to be introduced. Further advantages are obtained in particular if the gas is introduced in the gaseous phase into the intake line. The direct injection of the gas into the at least one cylinder is in contrast expedient to increase or attain the maximum power.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
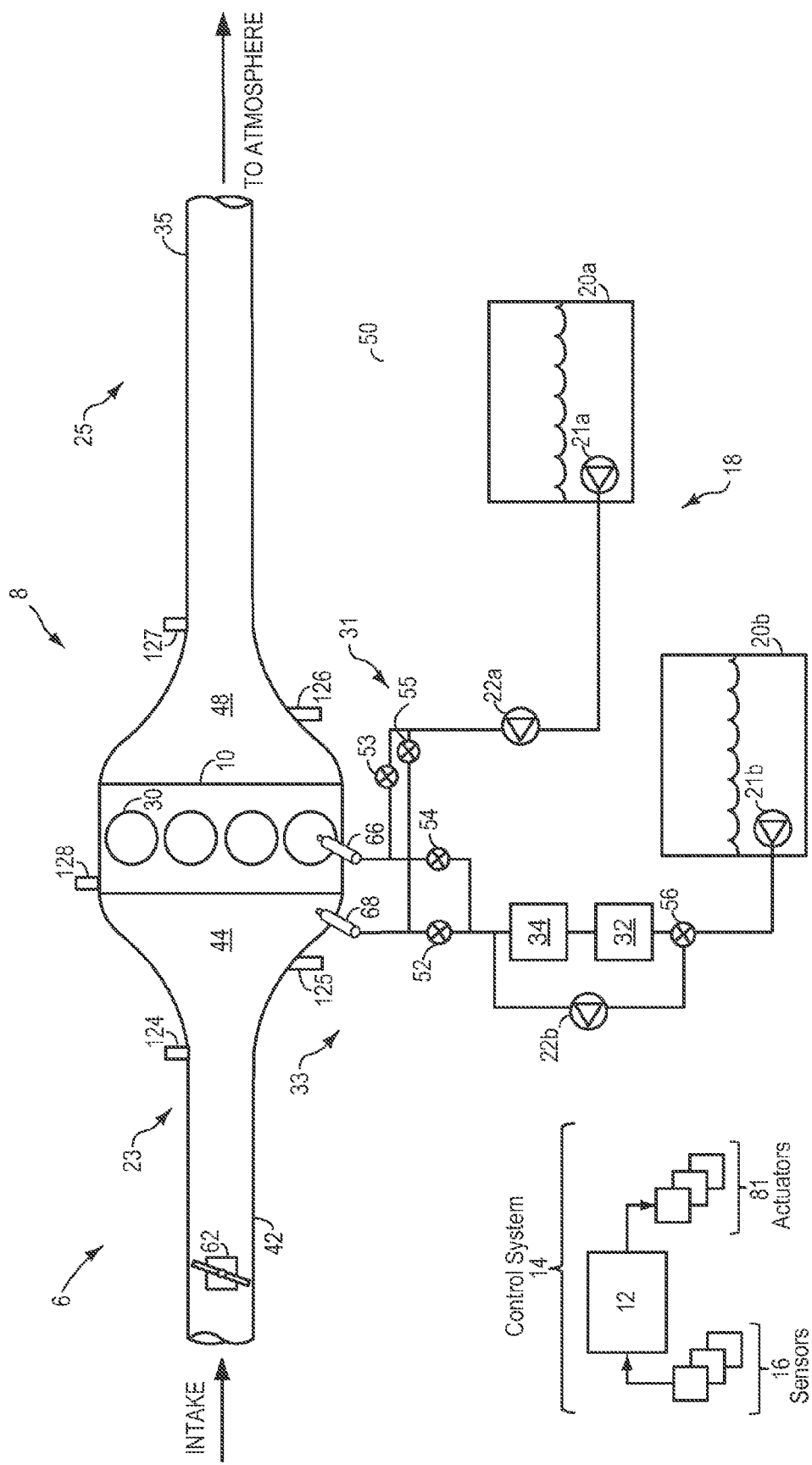
FIG. 1 schematically shows an embodiment of the internal combustion engine with externally-applied ignition.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. It will be appreciated that other components may be included in the engine such as a variety of valves and sensors.

Fuel system 18 may include one or more a fuel tanks 20a, 20b coupled to one or more pumps for pressurizing fuel delivered to the injectors of engine 10, such as the example injectors 66 and 68 shown. Fuel system 18 may include a direct injection system 31 and an intake pipe injection system 33. For the direct injection of fuel into the cylinders, that is to say to form a direct injection system 31, each cylinder is equipped with a separate injector, wherein in the present case gas serves, and is injected, as a fuel. The injectors are activated, that is to say controlled, by the engine controller 12 via a control line. The injected fuel quantity serves to set the air/fuel ratio λ. While only a single injector 66 is shown in the direct injection system 31, additional injectors are provided for each cylinder. Direct injection system may further include valves 53, 54 to regulate the supply of fuel from fuel tanks 20a, 20b to the direct injection system 31. Additionally, in some embodiments, fuel may be supplied to a common fuel rail (not shown) before being supplied to the injectors.

Fuel system 18 may also include an intake pipe injection system 33. The intake pipe injection system 33 injects fuel into each intake line, in an injector such as injector 68. While only a single injector 68 is shown in the intake pipe injection system 33, additional injectors may be provided for each cylinder. In some embodiments, the injector 68 may inject fuel into the intake port, thus comprising a port fuel injection system. In other embodiments, the intake pipe injection system 33 may comprise a single injector located in the intake passage 42. Similar to the direct injection system 31, intake pipe injection system 33 may also include a common fuel rail (not shown). Intake pipe injection system may further include valves 52, 55 to regulate the supply of fuel from fuel tanks 20a, 20b to the intake pipe injection system 33.

Fuel system 18 may also include a vaporizer 32 and regulator 34 to vaporize liquid fuel from fuel tank 20b into a gaseous fuel. The vaporizer 32 and regulator 34 may act to vaporize the liquid fuel from the fuel tank 20b and provide it to the injector 66 or 68 at a constant pressure. Fuel system 18 may further include valve 56 to regulate the supply of fuel from fuel tank 20b to the injectors and to regulate the supply of fuel through the vaporizer 32 such that fuel may be provided to the injectors of the intake pipe injection system 33 as a liquid or as a gaseous fuel. It can be appreciated that fuel system 18 may be a return-less fuel system, a return fuel system, or various other types of fuel system. In the embodiment depicted, fuel system 18 includes first fuel pumps 21a, 21b located in the fuel tanks 20a, 20b to provide low-pressure fuel. Second fuel pumps 22a, 22b are provided to provide high-pressure fuel to the direct and/or port injectors, such as injector 66.

When liquid fuel is injected from fuel tank 20b into the cylinders, the fuel pressure may be regulated by fuel pump 22b. In conditions where gaseous fuel is injected, the vapor pressure of the gaseous fuel may be regulated by regulator 34 and/or evaporator 32, and bypass valve 56 may be open to allow the fuel to bypass the fuel pump 22.

In some embodiments, direct injection system 31 and/or intake pipe injection system 33 may be configured to deliver both liquid fuel and gaseous fuel. To enable rapid transition between injection of liquid and gaseous fuel, injectors 66, 68 may be configured such each injector tip is pointing upwards. Further, injectors 66, 68 may be located at the highest point in the fuel rail (not shown). With this configuration, when fuel rail pressure is above vapor pressure, the injected fuel will include fuel in the liquid phase. On the other hand, when fuel rail pressure is below vapor pressure, the injected fuel will include fuel in the gaseous phase. In this way, injection of fuel in either liquid or gaseous phase may be accomplished with common fuel injectors.

Fuel system 18 also includes—aside from the actual low-pressure fuel pumps 21a, 21b—a second type of fuel pump, specifically high-pressure pumps 22a, 22b. Whereas the high-pressure pump 22 serves to provide the high injection pressures, the actual fuel pump 21 serves as a so-called pre-feed pump for charging the high-pressure pump 22. The fuel supply line which is arranged between the pre-feed pump 21 and the high-pressure pump 22 is referred to as a low-pressure line, whereas that part of the fuel supply line which runs between the high-pressure pump and the injection nozzles forms the fuel high-pressure line.

Direct-injection diesel engines also frequently have a special injection system, specifically a so-called common rail injection system, in which fuel is supplied to all the cylinders of the internal combustion engine by means of a common fuel high-pressure line—the so-called common rail—wherein the individual injection into the individual cylinders takes place, or is controlled, for example by means of piezoelectric actuators.

The fuel tanks 20a, 20b may hold a plurality of fuel or fuel blends, including gas fuel such as LPG or CNG, fuel with a range of alcohol concentrations, such as various gasoline-ethanol blends, including E10, E85, gasoline, etc., and combinations thereof. In some embodiments, fuel tank 20b may hold gas fuel such as LPG or CNG in the liquid phase, while fuel tank 20a may hold a different fuel, such as gasoline.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126 and temperature sensor 127 located in the exhaust, and knock sensor 128. Other sensors such as pressure, temperature, air/fuel ratio, and composition sensors may be coupled to various locations in the vehicle system 6. As another example, the actuators may include fuel pumps 22a, 22b, fuel injectors 66, 68, valves 52, 53, 54, 55, 56, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2 and 3.

If the internal combustion engine is equipped with an engine controller 12, embodiments are advantageous in which the engine controller 12 is adapted such that the fuel is introduced either by the intake pipe injection system 33 or by the direct injection system 31 as a function of the load T.

Direct injection provides multiple advantages during high load conditions. For example, introducing oxygenated, liquid fuels with direct injection and high heat of vaporization at high load provides charge cooling for increased air charge, dilution for combustion temperature control, and knock resistance.

On the other hand, intake pipe injection may provide advantages during low load conditions. For example, introducing high volatility fuels by intake injection at low load may provide enhanced startability, particulate emission reduction, and avoidance of unvaporized fuel. By utilizing either direct or intake injection over various areas of the speed-load map, the benefits provided by both systems may be maximized.

The system of FIG. 1 also provides for an internal combustion engine comprising at least one cylinder, at least one intake line for supplying fresh air or fresh mixture to the at least one cylinder, an intake pipe injection system to introduce fuel into the at least one intake line, a direct injection system to introduce the fuel into the at least one cylinder, and at least one fuel tank coupled to both the intake pipe injection system and the direct injection system, the fuel tank supplying the same fuel to each injection system, the fuel comprising gaseous or liquefied gaseous fuel. The system also provides an engine controller, the engine controller configured to introduce the fuel by intake pipe injection or by direct injection, based on engine load. The system may include the engine controller being configured, when engine load is below a threshold, to control the intake pipe injection system to introduce the fuel in a gaseous phase into the at least one intake line and to control the direct injection system to block the fuel from being introduced into the at least one cylinder. The system may also include the engine controller being configured, when engine load is above a threshold, to control the direct injection system to introduce the fuel in a liquid phase into the at least one cylinder and to control the intake pipe injection system to block the fuel from being introduced into the at least one intake line.

Figure 2A:
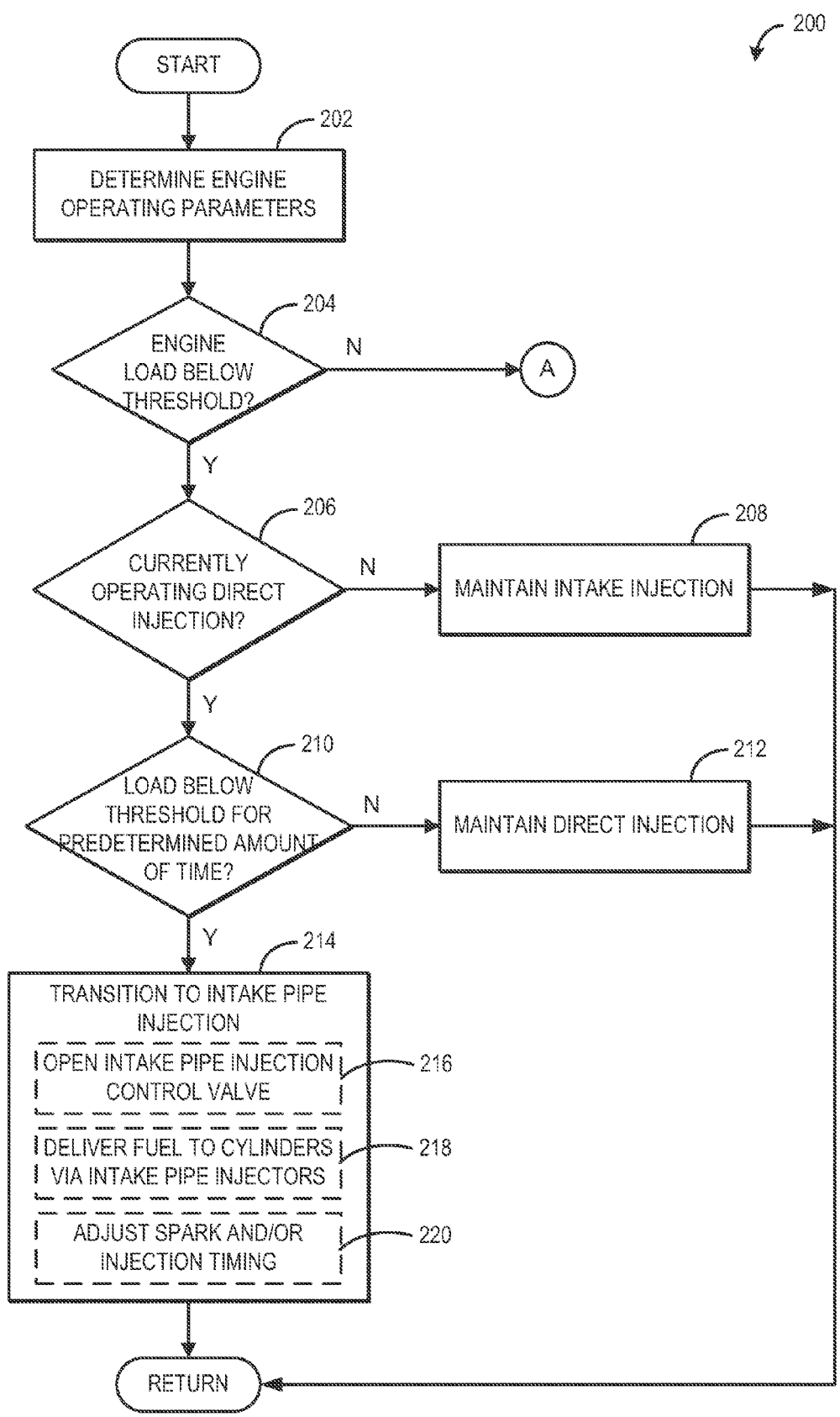
FIGS. 2A and 2B show a flow chart illustrating an example method for introducing fuel according to an embodiment of the present disclosure.
Figure 2B:
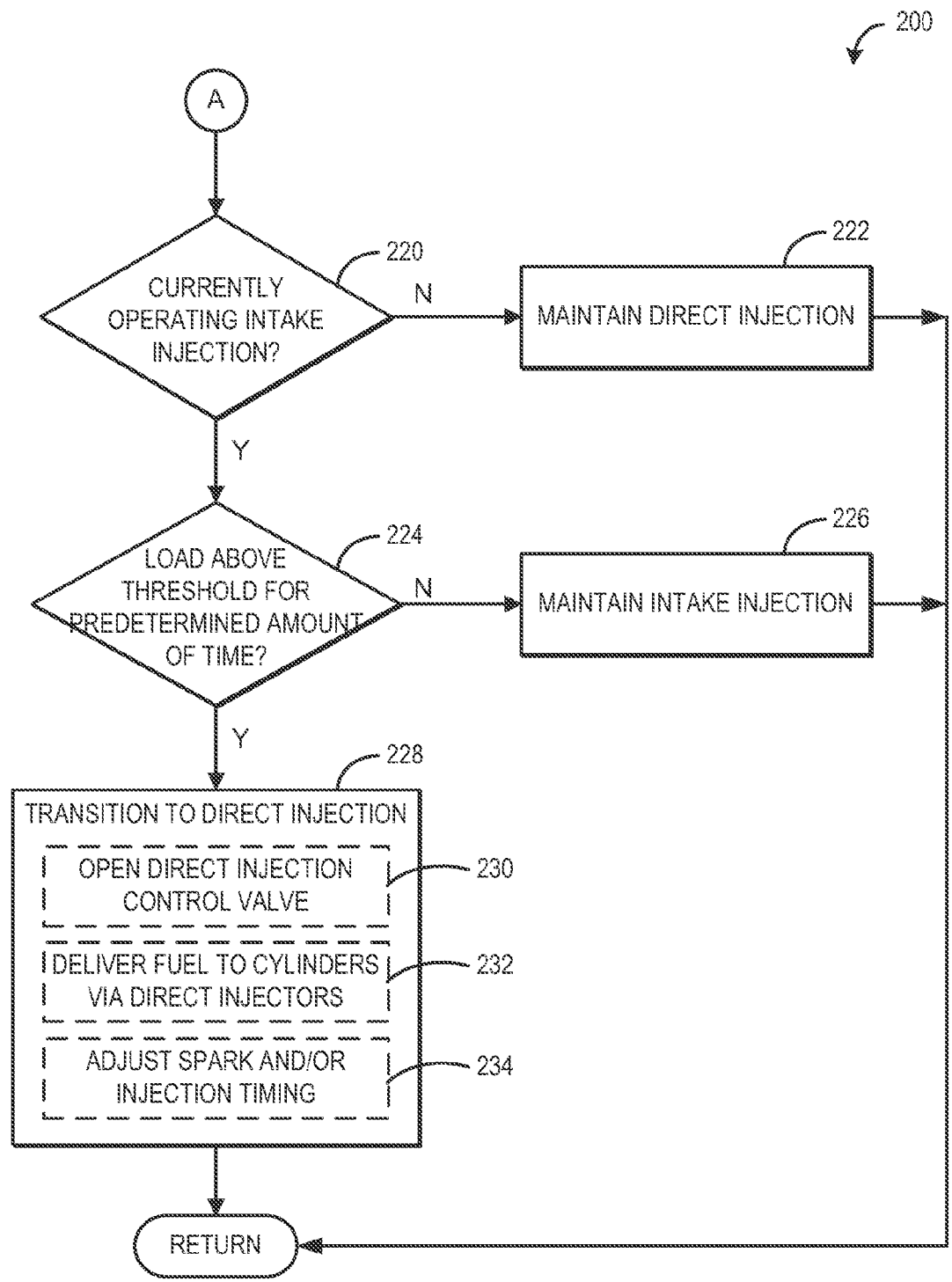

FIGS. 2A and 2B are a flow chart illustrating an example method 200 for introducing fuel to the engine based on load. Method 200 may be carried out by controller 12. Controller 12 may be configured to enable direct injection at engine loads above a threshold and enable intake pipe injection at loads below the threshold, as described below. Method 200 comprises, at 202, determining engine operating parameters. Engine operating parameters may include determining engine speed, load, temperature, etc., based on feedback from sensors such as sensors 124 and 125, and may include determining which injection method is currently being operated. At 204, it is determined if engine load is below a threshold. The load threshold may be any suitable threshold below which it becomes advantageous to inject fuel via an intake pipe injection system, and comprises load in the mid-load range. In some embodiments, the threshold may be 50% load, or may be 60% load. Any load threshold is within the scope of this disclosure.

If it is determined at 204 that load in not below the threshold, method 200 proceeds to 220, which will be described in more detail below. If it is determined at 204 that load is below the threshold, method 200 proceeds to 206 to determine if the engine is currently operating with direct injection. If the engine is not operating with direct injection, it is thus operating with intake injection, and method 200 comprises maintaining intake pipe injection at 208, as load is below the threshold. If the engine is currently operating with direct injection, method 200 proceeds to 210 to determine if the load has been below the threshold for a predetermined amount of time. Any amount of time may be used, such as one second, five seconds, etc. In other embodiments, 210 may comprise determining if load has been below the threshold for a predetermined number of engine cycles.

If load has not been below the threshold for a predetermined amount of time, method 200 proceeds to 212 to maintain direct injection. If load has been below the threshold for the predetermined amount of time, method 200 proceeds to 214 to transition to intake pipe injection. To enable intake pipe injection, an intake pipe injection control valve, such as valve 54, opens at 216. Further, a control valve for the direct injection system may concurrently close. Fuel may then be pumped from the fuel tank to the intake pipe injection cylinders so that fuel can be delivered to the cylinders at 218. At 220, spark timing and/or fuel injection timing may be adjusted to compensate for the different charge properties of the intake pipe injection system. Method 200 then returns.

Returning to 204, if it is determined that engine load is not below the threshold, method 200 proceeds to 220 to determine if the engine is currently operating with intake pipe injection. If the engine is not currently operating with intake pipe injection, method 200 proceeds to 222 to maintain direct injection, as load is not below the threshold. If it is determined at 220 that the engine is currently operating with intake injection, method 200 proceeds to 224 to determine if load has been above the threshold for a predetermined amount of time. If not, intake pipe injection is maintained at 226. If load has been above the threshold for a predetermined amount of time, method 200 proceeds to 228 to transition to direct injection. Transitioning to direct injection includes opening the direct injection control valve at 230, delivering fuel to cylinders via the direct injectors at 232, and adjusting spark and/or injection timing at 234. Method 200 then returns.

Thus, in the embodiment described with respect to FIGS. 2A and 2B, the intake pipe injection system may be used at low and medium loads T, whereas the direct injection system may be used at high loads T. Transitioning from the use of the intake pipe injection system at low loads, a switch is made to the use of the direct injection system if the load, $T_{orque}$, exceeds a first, predefinable load threshold, $T_{orque,up}$.

In practice, a change in the injection method takes place generally through the use of different characteristic maps for the intake pipe injection on the one hand and the direct injection on the other hand. The change may be associated in particular with a change in the ignition time and/or start of injection, or else an adaptation of the injection duration.

Embodiments of the method are advantageous in which, proceeding from the use of the intake pipe injection system at low loads, a switch is made to the use of the direct injection system only when the load $T_{orque}$ exceeds the first predefinable load threshold $T_{orque,up}$ and remains higher than said predefinable load threshold $T_{orque,up}$ for a predetermined amount of time, $\Delta t_{up}$.

The introduction of an additional condition for the change to the use of the direct injection system is intended to reliably prevent too frequent or hasty a change in the operating parameters, in particular a change to the use of the direct injection system when the load $T_{orque}$ only briefly exceeds the predefined load $T_{orque,up}$ and then falls again or fluctuates about said predefined load $T_{orque,up}$ without the exceedance of said load limit justifying a change to the use of the direct injection system.

In this connection, it may be taken into consideration that the direct-injection method reacts sensitively to changes and deviations in the mixture formation. The sensitivity of the method increases with decreasing load, because at low and medium loads, smaller fuel quantities are injected, which makes the provision of a reproducible air/fuel mixture more difficult. Misfires or ignition failures may therefore occur more frequently if direct injection of the fuel is carried out in the part-load range. These have the effect that the fuel is discharged unburned out of the cylinder via the exhaust line, which may be evaluated as being critical with regard to pollutant emissions.

The additional condition in the method variant in question ensures that a switch is made to a direct injection only when the boundary conditions are present or suitable for a direct injection of the gas, and an adequate mixture formation can be ensured.

Embodiments of the method are advantageous in which, proceeding from the use of the direct injection system at high loads, a switch is made to the use of the intake pipe injection system again if the load $T_{orque}$ drops below a second, predefinable load threshold $T_{orque,down}$, where $T_{orque} \leq T_{orque,down}$. In some embodiments, the second load threshold, $T_{orque,down}$, may be equal to the first load threshold, $T_{orque,up}$.

With regard to the fuel-air mixture preparation, it is advantageous to change to the use of the intake pipe injection system at part load in order to provide a thoroughly mixed homogeneous fuel/air mixture to the cylinders and ensure a reliable ignition of the mixture.

In the present connection, embodiments of the method are also advantageous in which, proceeding from the use of the direct injection system at high loads, a switch is made to the use of the intake pipe injection system again only if the load $T_{orque}$ is below the second, predefinable load threshold $T_{orque,down}$ and remains lower than said predefinable load $T_{orque,down}$ for a second, predefinable amount of time, $\Delta t_{down}$.

The above condition for the change of the injection method is intended to help prevent too frequent or hasty a change of the operating parameters. Reference is made to that which has already been stated in connection with the time period $\Delta t_{up}$. Following the approach in question, it is possible to react in an appropriate manner to scenarios in which the load $T_{orque}$ only briefly undershoots the predefined load $T_{orque,down}$ and then increases again, or fluctuates around the predefined load.

Embodiments of the method are advantageous in which the gas which serves as a fuel for the internal combustion engine is LPG. LPG has the advantage that it is present, and can be stored, in the liquid phase already at low pressures of approximately 5 or 6 bar and at ambient temperature, whereas natural gas may be purposely cooled in order to be able to be liquefied.

Embodiments of the method are likewise advantageous in which the gas which serves as a fuel for the internal combustion engine is hydrogen ($H_2$).

Embodiments of the method are advantageous in which the gas which serves as a fuel for the internal combustion engine is introduced in the liquid phase into the at least one intake line by the intake pipe injection system.

The injection of liquid into the intake pipe has proven, in full load operation, to be not quite as expedient as the direct injection of liquid into the cylinders, because the evaporation heat does not act directly in the cylinder, as a result of which higher gas temperatures can be generated in the cylinder, which have an adverse effect on knocking behavior.

Nevertheless, an advantageous and comparatively cost-effective method variant is, for example, the combination of an intake pipe injection of liquid fuel at full load and an intake pipe injection of gaseous fuel at part load.

The liquefied gas introduced into the inducted air is evaporated, wherein the evaporation heat is extracted from the inducted air flow. The temperature of the air supplied to the cylinders, and therefore also the temperature of the cylinder fresh charge as a whole, is consequently reduced. The risk of knocking and the occurrence of undesired auto-ignition in the gas/air mixture are thereby reduced.

Furthermore, a reduction of the temperature of the cylinder fresh charge leads to a reduced thermal loading of the internal combustion engine and to a lower concentration of nitrogen oxides ($NO_x$) in the exhaust gas, that is to say to reduced nitrogen oxide emissions.

The reduction of the temperature, however, also increases the density of the air, such that the injection of the gas in liquid form contributes to an improved charging of the combustion chamber with air, wherein the increase of the air mass supplied to the combustion chamber may, if appropriate, be counteracted by more intense throttling.

Since the effects described above entail intensified throttling in the part-load range, that is to say necessitate a more intense pressure reduction, in order to reduce the inducted air quantity, it may be advantageous for the gas to be introduced into the intake line not in the liquid phase but rather in the gaseous phase. In the gaseous phase, the introduced gas has a significantly greater volume, for which reason a throttle element provided in the intake line may be opened further without the air quantity inducted via the intake line being increased. This has considerable advantages with regard to the desired dethrottling of the internal combustion engine. Furthermore, no cooling of the inducted air flow takes place, because an evaporation of the introduced gas, and therefore the temperature reduction caused by this, are eliminated.

Embodiments of the method are therefore particularly advantageous in which the gas which serves as a fuel for the internal combustion engine is introduced in the gaseous phase into the at least one intake line by the intake pipe injection system.

In the case of the gaseous injection of the fuel into the intake pipe, a large part of the inducted air is displaced, that is to say substituted, by the gaseous fuel, such that the internal combustion engine can be operated in a significantly more dethrottled manner in part load operation than is the case with an injection of liquid into the combustion chamber.

In contrast, in full load operation, the gaseous injection of the fuel is disadvantageous because, as a result of the volume displacement of the gas, the charging of the cylinder is hindered, and therefore the volumetric efficiency and the maximum attainable power decrease significantly. Furthermore, in the case of the gaseous introduction of the fuel, no evaporation heat is extracted from the fuel/air mixture, as would be the case with liquid injection. The lack of cylinder-internal cooling results in higher mixture temperatures in the combustion chamber. The high temperatures lead to an increased knocking tendency, such that a withdrawal of the ignition is performed at full load, which decreases engine efficiency.

Figure 3:
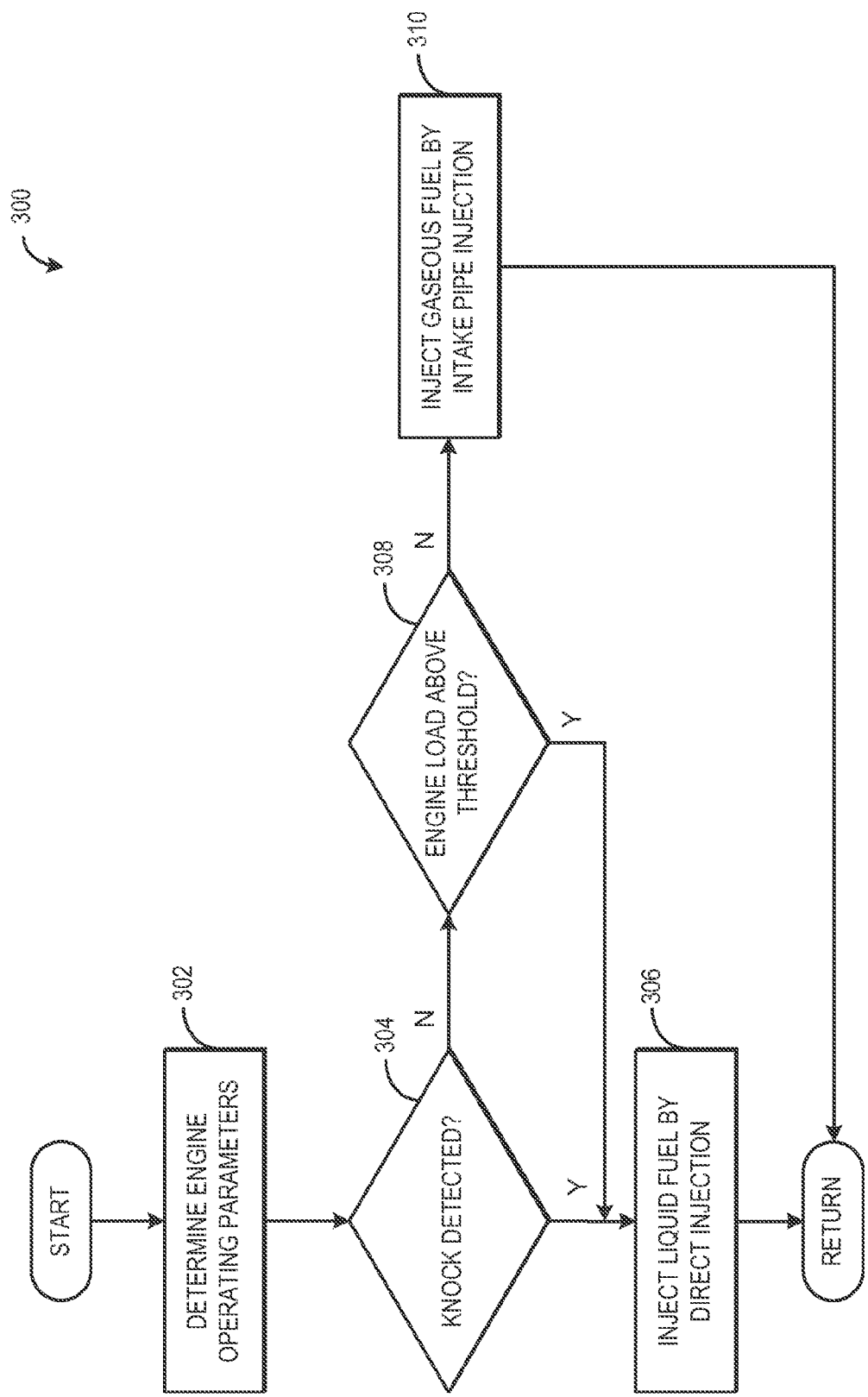
FIG. 3 is a flow chart illustrating an example method for controlling knock according to an embodiment of the present disclosure.

FIG. 3 depicts a flow chart illustrating a method 300 for controlling cylinder knock in an engine. Method 300 may be carried out by a controller, such as controller 12. Method 300 comprises, at 302, determining engine operating parameters, similar to 202 of method 200, described above with respect to FIG. 2A. At 304, it is determined whether cylinder knock is detected. Cylinder knocking may be detected by one or more knock sensors located in the engine, such as sensor 128. If knocking is detected, liquid fuel is injected by direct injection at 306. As described above, direct injection of liquid fuel may cool cylinder combustion temperatures and reduce knocking. In some embodiments, additional knock mitigating actions may also be taken, such as adjusting spark timing.

If no knocking is detected, method 300 proceeds to 308 to determine if engine load is above the threshold. If load is not above the threshold, gaseous fuel is injected by intake pipe injection at 310. If load is above the threshold, liquid fuel is injected by direct injection at 306.

Thus, method 300 provides for controlling cylinder knock by direct injecting liquid fuel, even when load is below the threshold that may otherwise indicate intake pipe injection. Therefore, in full-load operation, a liquid injection of the fuel is advantageous, in particular directly into the cylinders in order to utilize the maximum cylinder-internal cooling effect.

The direct injection of the gas into the at least one cylinder also has advantages over the use of intake pipe injection with regard to the maximum attainable power. At high loads, the comparatively large fuel quantity, that is to say gas quantity, can be introduced into the at least one cylinder more easily, that is to say with less expenditure, in the liquid phase than in the gaseous phase. The injection duration for introducing the entire fuel quantity could otherwise be disproportionately and/or unacceptably long.

Embodiments of the method may however also be advantageous in which the gas which serves as a fuel for the internal combustion engine is introduced in the gaseous phase into the at least one cylinder by the direct injection system.

In some embodiments, the above described methods may provide for selectively delivering a fuel from a fuel tank to a cylinder, the fuel injected as a liquid via direct injection during a first condition, and as a gas via port injection during a second condition. The first condition may include medium to high engine loads, and the second condition may include low to medium engine loads. During the first condition, only liquid direct injection to the cylinder may be used, and during the second condition only gaseous port injection to the cylinder may be used.

Figure 4:
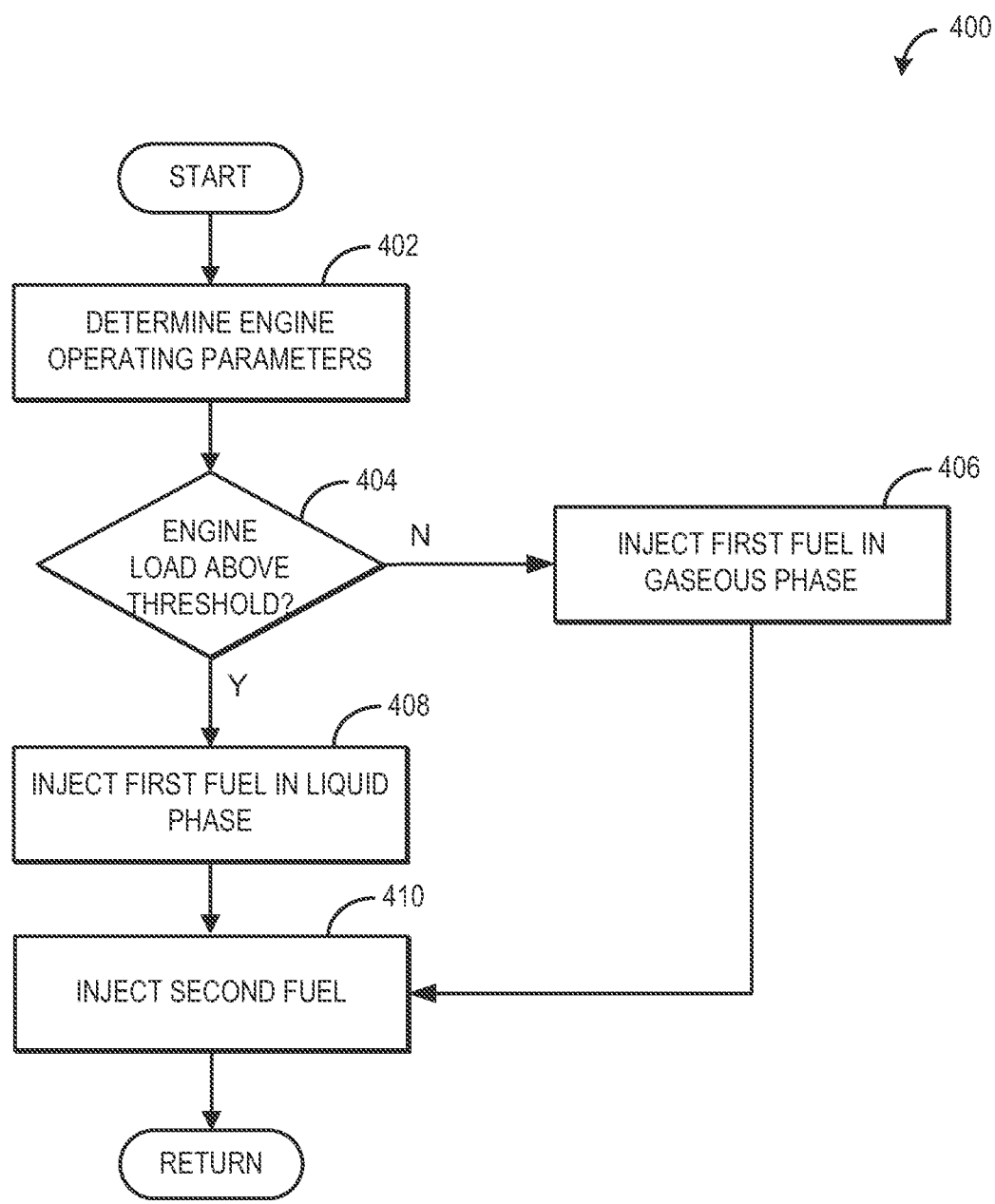
FIG. 4 shows a flow chart illustrating an example method for introducing fuel according to another embodiment of the present disclosure.

FIG. 4 is a flow chart illustrating a method 400 for introducing fuel to an engine based on engine load, according to an embodiment of the present disclosure. Method 400 may be carried out by an engine control system, such as control system 14. Method 400 comprises, at 402, determining engine operating conditions, such as engine speed, load, etc. At 404, method 400 comprises determining if load is above a threshold, such as the threshold described above with respect to FIG. 2. If load is not above the threshold, method 400 proceeds to 406 to inject a first fuel to the engine in gaseous phase. In some embodiments, the gaseous fuel may injected using an intake pipe injection system. In other embodiments, it may be injected using a direct injection system. If it is determined that engine load is above the threshold, method 400 proceeds to 408 to inject the first fuel to the engine in liquid phase. Again, the liquid fuel may be injected using an intake pipe injection system or a direct injection system. Additionally, whether injecting the first fuel as a gas or as a liquid, common injectors may be used to inject both. Method 400 proceeds from both 406 and 408 to 410 to optionally inject a second fuel, different from the first fuel. The second fuel may injected from either the direct or intake injection system. Further, in some embodiments, this portion of method 400 may be dispensed with and only the first fuel injected.

Figure 5:
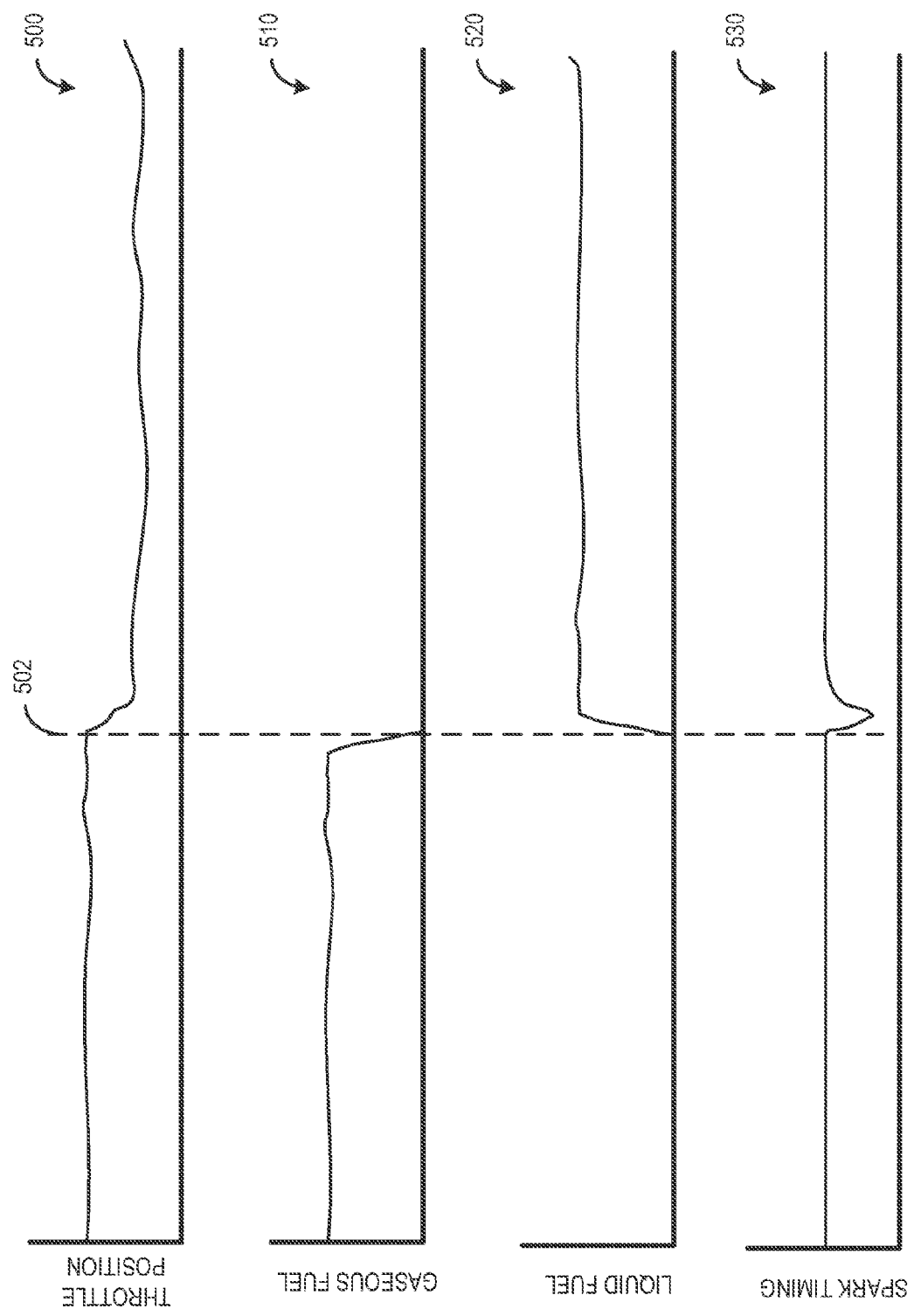
FIG. 5 depicts example engine traces for various operating parameters according to an embodiment of the present disclosure.

FIG. 5 depicts example traces of various engine operating parameters according to the above described embodiment. Example throttle position 500, gaseous fuel injection amount 510, liquid fuel injection amount 520, and spark timing 530 traces are depicted. In each trace, time is depicted along the x-axis, while each respective operating parameter is depicted along the y-axis. At the beginning of the traces, the engine is operating under low load conditions, and gaseous fuel is being injected via the intake pipe, or port, injection system, while no liquid fuel is being injected through the direct injection system. At 502, engine load increases above a threshold, such as the threshold described with respect to FIG. 2A, and the intake pipe injection system stops injecting gaseous fuel and the direct injection system starts injecting liquid fuel. As a result, the throttle position is adjusted to restrict the throttle opening. Because the gaseous fuel occupies a larger volume than the liquid fuel, transitioning to liquid fuel injection includes closing the throttle in order to maintain the same amount of charge in the cylinders and avoid torque disturbances. However, during the transition, transient conditions may still lead to increased torque. To account for this, spark timing may be retarded during the transition.

Figure 6:
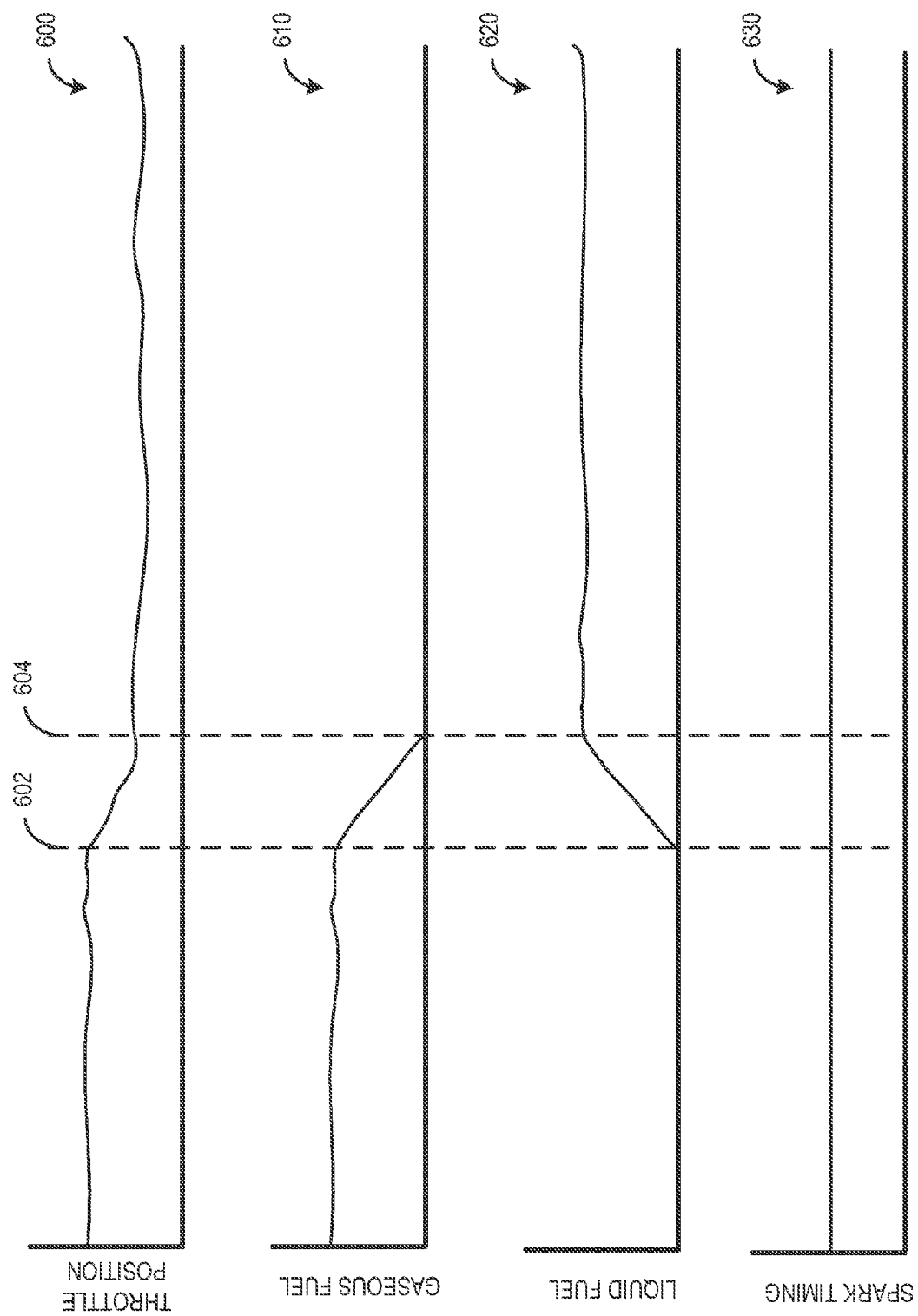
FIG. 6 depicts example engine traces for various operating parameters according to another embodiment of the present disclosure.

FIG. 6 depicts example traces of the same operating parameters as FIG. 5, according to another embodiment of the present disclosure. Example throttle position 600, gaseous fuel injection amount 610, liquid fuel injection amount 620, and spark timing 630 traces are depicted. At 602, similar to 502 described with respect to FIG. 5, engine load increases and the engine transitions to using liquid fuel direct injection rather than gaseous fuel intake injection. However, instead of cutting off the intake injectors and subsequently starting the direct injectors, there is a period of overlap where the amount of liquid fuel injected via direct injection ramps up and the amount of gaseous fuel injected via intake injection tapers. As a result, the throttle position changes more gradually, and no adjustment to the spark timing is made. At 604, the transition ends and the engine injects all fuel via gaseous intake injection.

In addition to the embodiment described above, whereby overlap between the two injection systems occurs during a transition from one system to the other, in other embodiments, additional conditions may benefit from both systems injecting fuel simultaneously. For example, if engine knocking is detected while gaseous fuel is being injected by the intake pipe injection system, the engine may temporarily direct inject liquid fuel without stopping the gaseous intake injection. This may occur under less severe knocking conditions, wherein the liquid direct injection may be utilized temporarily to reduce the knocking without transitioning to fully liquid direct injection. If the knocking is more severe, the engine may transition to only liquid direct injection to alleviate the knocking.

That which has already been stated with regard to the method according to the disclosure also applies to the internal combustion engine according to the disclosure, for which reason reference is generally made at this juncture to the statements made with regard to the method. The different method variants utilize an internal combustion engine corresponding thereto.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an internal combustion engine, comprising:
   during low and medium load conditions, introducing fuel from a fuel tank to at least one cylinder of the engine by intake pipe injection and not by direct injection into at least one intake air line coupled to the at least one cylinder, the fuel in the fuel tank comprising gaseous or liquefied gaseous fuel; and
   during high load conditions, introducing the fuel from the fuel tank to the at least one cylinder by direct injection in a liquid phase into the at least one cylinder.

2. The method as claimed in claim 1, further comprising transitioning from intake pipe injection to direction injection only when load exceeds a first threshold and remains higher than said first threshold for a first predefined amount of time.

3. The method as claimed in claim 2, further comprising transitioning from direct injection to intake pipe injection when load drops below a second threshold.

4. The method as claimed in claim 3, wherein transitioning from direct injection to intake pipe injection further comprises only transitioning if load drops below the second threshold and remains lower than said second threshold for a second predefined amount of time.

5. The method as claimed in claim 3, wherein the first and second thresholds are equal.

6. The method as claimed in claim 1, wherein the fuel comprises liquefied petroleum gas.

7. The method as claimed in claim 1, wherein the fuel comprises one or more of compressed and liquefied natural gas.

8. The method as claimed in claim 1, wherein the fuel comprises hydrogen.

9. The method as claimed in claim 1, wherein during intake pipe injection, the fuel is introduced in a liquid phase into the at least one intake air line.

10. The method as claimed in claim 1, wherein during intake pipe injection, the fuel is introduced in a gaseous phase into the at least one intake air line.

11. An engine method, comprising:
    when engine load is below a threshold, introducing a first fuel in gaseous phase to an engine; and
    when engine load is above the threshold, introducing the first fuel in liquid phase to the engine, the fuel in gaseous or liquid phase introduced to the engine via one or more common injectors.

12. The method of claim 11, wherein introducing the first fuel in gaseous phase to the engine comprises injecting gaseous fuel by intake pipe injection into at least one intake air line coupled to at least one cylinder, and wherein introducing the first fuel in liquid phase to the engine comprises injecting liquid fuel by intake pipe injection into the at least one intake air line coupled to the at least one cylinder.

13. The method of claim 12, further comprising injecting a second fuel, different from the first fuel, by direct injection into the at least one cylinder or by intake pipe injection into the at least one intake air line coupled to the at least one cylinder.

14. The method of claim 11, wherein introducing the first fuel in gaseous phase to the engine comprises injecting gaseous fuel by direct injection into at least one cylinder, and wherein introducing the first fuel in liquid phase to the engine comprises injecting liquid fuel by direct injection into the at least one cylinder.

15. The method of claim 14, further comprising injecting a second fuel, different from the first fuel, by intake pipe injection into at least one intake air line coupled to the at least one cylinder.

16. An engine method, comprising:
    when engine load is below a threshold, injecting gaseous fuel by intake pipe injection and not direct injection into at least one intake air line coupled to at least one cylinder;
    when engine load is above the threshold, injecting liquid fuel by direct injection into the at least one cylinder; and
    injecting liquid fuel by direct injection into the at least one cylinder in response to cylinder knocking, even when load is below the threshold, wherein both the liquid fuel for direct injection and the gaseous fuel for intake pipe injection are supplied from a same fuel tank.

17. The method as claimed in claim 16, wherein injecting liquid fuel by direct injection further comprises injecting liquefied petroleum gas, and wherein injecting gaseous fuel by intake pipe injection further comprises injecting vaporized liquefied petroleum gas.

* * * * *